United States Patent [19]

Koskan et al.

[11] Patent Number: 5,296,578
[45] Date of Patent: Mar. 22, 1994

[54] PRODUCTION OF POLYSUCCINIMIDE AND POLYASPARTIC ACID FROM MALEIC ANHYDRIDE AND AMMONIA

[75] Inventors: Larry P. Koskan, Orland Park; Abdul R. Y. Meah, Justice, both of Ill.

[73] Assignee: Donlar Corporation, Bedford Park, Ill.

[21] Appl. No.: 947,712

[22] Filed: Sep. 18, 1992

[51] Int. Cl.5 .................................. C08G 69/00
[52] U.S. Cl. ............................ 528/363; 525/418; 525/420
[58] Field of Search .............. 528/363; 525/420, 418

[56] References Cited

U.S. PATENT DOCUMENTS

| | | | |
|---|---|---|---|
| 3,846,380 | 11/1974 | Fujimoto et al. | 528/327 |
| 4,839,461 | 6/1989 | Boehmke | 528/363 |
| 5,057,597 | 10/1991 | Koskan | 528/328 |
| 5,116,513 | 5/1992 | Koskan et al. | 210/698 |

Primary Examiner—Harold D. Anderson
Attorney, Agent, or Firm—Talivaldis Cepuritis

[57] ABSTRACT

Production of polysuccinimide by reacting maleic anhydride and ammonia at elevated temperatures. The base hydrolyzed polyaspartic acid product.

11 Claims, No Drawings

PRODUCTION OF POLYSUCCINIMIDE AND POLYASPARTIC ACID FROM MALEIC ANHYDRIDE AND AMMONIA

FIELD OF THE INVENTION

The invention is in the field of polymer formation. More particularly, the invention is in the field of polysuccinimide and polyaspartic acid formation.

BACKGROUND

Polyaspartic acid has been formed by a number of methods. Koskan et al, U.S. Pat. No. 5,116,513, teaches the formation of polyaspartic acid by the polymerization of aspartic acid powder. The polymerization produces a polysuccinimide, which can then be base hydrolyzed to polyaspartic acid.

Boehmke et al, U.S. Pat. No. 4,839,461, teaches the production of polyaspartic acid by reacting maleic acid and ammonia in a molar ratio of 1:1 to 1.5 at 120°-150° C.

SUMMARY

We have discovered that polysuccinimide can be produced with unexpectedly high yields using maleic anhydride and ammonia at elevated temperatures. The resulting polysuccinimide can be base hydrolyzed to produce polyaspartic acid.

At elevated temperatures above at least 200° C. a low molecular weight polysuccinimide having a molecular weight within the range of 1000-3000 Mw can be produced in yields exceeding 60%.

The preferred temperature range is from 170° C. to 260° C. A more preferred temperature range is from 200° C. to 260° C. The most preferred temperature range is from 220° C. to 240° C.

The yield can be increased by increasing the length of the reaction. For optimization of yield generally, 6 to 14 hours is preferred. More preferred is 7 to 10 hours.

Increasing the amount of ammonia relative to the amount of maleic anhydride can also increase yield. For optimization, generally, 1 to 12 times the number of moles of maleic anhydride is preferred, two to five times is more preferred, and two to three times is most preferred.

DESCRIPTION OF THE PREFERRED EMBODIMENTS

A series of experiments were performed to determine the appropriate conditions for producing polysuccinimide from maleic anhydride and ammonia.

The experiments utilized maleic anhydride. However, maleic anhydride equivalents such as maleic acid and its salts are useable.

For purposes of this invention, the term "polyaspartic acid" includes the salts of polyaspartic acid.

The experiments are described below, as follows:

Production of Adduct and Low Molecular Weight Polymer

Example 1

98 grams of maleic anhydride (1 mole) were slurried with 50 grams of water and heated to 55° C. for 30 minutes in an oil bath. 68 grams of 30% Ammonium hydroxide was then added and the mixture heated for four hours at an oil bath temperature of 130° C. (a reaction mixture temperature of 115° C.). The product produced a positive Biuret test for peptide. After hydrolysis, Gel Permeation Chromatography (hereinafter designated as GPC) clearly showed that less than 10% of any polymer was formed. Titration confirmed this result.

Example 2

98 grams (1 mole) of maleic anhydride were slurried with 50 grams of water and heated at 75° C. for 30 minutes in order to melt the maleic anhydride. The mixture was placed in a water bath, cooled to room temperature, and 68 grams (1 mole) of 30 wt. % ammonium hydroxide was added dropwise to minimize ammonia loss during the exotherm.

Upon completion of the ammonia addition, stirring commenced, and a temperature of 75°-85° C. was attained and maintained for 2-3 hours producing a glassy, white substance.

The product was transferred to a reaction vessel and heated to a 135° C. oil bath temperature for a reaction mixture temperature 115° C. During the four hours of heating, water formation indicative of a condensation reaction was observed. Upon completion of the reaction, a brittle solidified product was observed. After hydrolysis, GPC clearly showed the presence of a small amount of polymer. Titration showed about 20% polymer.

Example 3

The product of Example 2 was ground; 15 grams were placed in a test tube and heated for 4-5 hours at a 150° C. oil bath temperature (140° C. reaction mixture temperature). After hydrolysis, GPC data showed the presence of a polymer shoulder. Titration showed 30% polymer.

Example 4

The product of Example 2 was ground; 15 grams were placed in a test tube and heated for 5 hours at 180° C. oil bath temperature (170° C. reaction mixture temperature). After hydrolysis, GPC data clearly showed about 50% polymer. Titration data confirmed this amount.

Example 5

The product of Example 2 was ground; 20 grams were placed in a test tube and heated in an oil bath for 5 hours at 220° C. The product was water insoluble. GPC analysis of the hydrolyzed product evidenced a strong polyaspartic acid peak. Titration showed 90% polysuccinimide.

Example 6

98 grams of maleic anhydride were slurried with 50 grams of water and heated at 75° C. for 30 minutes in order to melt the maleic anhydride. The mixture was placed in a water bath, cooled to room temperature, and 68 grams of 30 wt. % ammonium hydroxide was added dropwise to minimize ammonia loss during the exotherm.

Upon completion of the ammonia addition, stirring commenced, and a temperature of 75°-85° C. was attained and maintained for 2-3 hours producing a glassy, white substance.

The product was transferred to a reaction vessel and heated to a 125° C. oil bath temperature (reaction mixture temperature 110° C. During the four hours of heating, water formation indicative of a condensation reaction was observed. Upon completion of the reaction, a brittle solidified product was observed. GPC showed the presence of no polymer. Titration data showed less than 5% polysuccinimide formation.

Example 7

Increased Ammonia 196 grams (2 moles) of maleic anhydride were slurried with 100 grams of water and heated at 75° C. for 45 minutes in order to melt the maleic anhydride. The mixture was placed in a water bath, cooled to room temperature, and 204 grams (3 moles) of 30 wt. % ammonium hydroxide was added dropwise to minimize ammonia loss during the exotherm.

Upon completion of the ammonia addition, stirring commenced, and a temperature of 75°-85° C. was attained and maintained for 6 hours producing a glassy, white substance.

The product was transferred to a reaction vessel and heated in an oil bath temperature to a reaction mixture temperature 120° C. with a corresponding oil bath temperature of 135° C. During the fourteen hours of heating, water formation indicative of a condensation reaction was observed. Upon completion of the reaction, a yellowish hard material was observed. Titration showed 0% polymer. GPC results were consistent with the titration.

Example 8

196 grams (2 moles) of maleic anhydride were slurried with 100 grams of water and heated to 55° C. with stirring for 45 minutes. The mixture was cooled to room temperature; 408 grams (6 moles) of 30 wt. % aqueous ammonium hydroxide was slowly added with cooling to minimize ammonia loss. Upon completion of the addition, the mixture was heated to 75°-85° C. for 6 hours, and a white glassy substance was observed. This was heated in an oil bath to to a reaction mixture of 240° C. (with a corresponding oil bath temperature of temperature 250° C.) for 7 hours and a dark yellow brittle product was obtained. Titration showed 100% polymer. This was confirmed by GPC of the hydrolyzed product.

In the Examples presented above, there was no strong experimental suggestion that polysuccinimide had been produced in significant amounts at temperatures less than 150° C. At temperatures of 150° C. or lower a maleic anhydride/ammonia adduct was formed. It appears that at elevated temperatures that adduct participated in a polymerization reaction. Once the 200° C. threshold was reached or surpassed GPC and titration studies gave clear evidence of polysuccinimide formation and under these elevated temperatures the yield was high, over 70%. At temperatures above 220° C. the yield attained the maximum of 100% of theoretical and generally exceeded 90% of theoretical. At temperatures above 150° C., a yield of 60% theoretical was obtained. At temperatures exceeding 170° C., at least 70% of the theoretical yield was obtained. At temperatures exceeding 200° C. at least 80% of theoretical yield was obtained.

Having described our invention, we claim as follows:

1. A method of producing a polysuccinimide comprising the steps of:
   a). adding maleic anhydride and ammonia to the same reaction vessel, and
   b). heating the resulting mixture to a temperature of at least 170° C., until at least a yield of polysuccinimide of at least 70% of theoretical has been produced.

2. The method of claim 1, wherein the reaction mixture is heated for at least 6 hours.

3. The method of claim 1, wherein the mixture is heated to a temperature within the range of 220° C. to 260° C. until a yield of polysuccinimide which is at least 80% of theoretical has been produced.

4. The method of claim 3, wherein the polysuccinimide has a weight average molecular weight within the range of 1000 to 3000.

5. The method of claim 4, wherein the mixture is heated to a temperature within the temperature range of 220° C. to 260° C. for at least 7 hours.

6. The method of claim 4, wherein the mixture is heated to a temperature within the temperature range of 220° C. to 260° C. for at least 11 hours.

7. The method of claim 1, wherein, the mixture is heated to a temperature within the range of from 220° C. to 240° C. until yield of polysuccinimide which is at least 80% of theoretical has been produced.

8. The method of claim 7, wherein the mixture is heated within the temperature range of 220° C. to 240° C. for at least 11 hours and a yield of polysuccinimide which is at least 90% of theoretical is produced.

9. The method of claim 5, wherein the mole ratio of maleic anhydride to ammonia is within the range of 1:1 to 1:12.

10. The method of claim 7, wherein the mole ratio of maleic anhyride to ammonia is within the range of 1:2 to 1:5.

11. The method claim 8, wherein the mole ratio of maleic anhydride to ammonia is 1:2 to 2:3.

* * * * *